US010259917B2

(12) United States Patent
Spencer et al.

(10) Patent No.: US 10,259,917 B2
(45) Date of Patent: Apr. 16, 2019

(54) CARBON FIBRE-CONTAINING PREPREGS

(71) Applicant: Gurit (UK) Ltd., Newport, Isle of Wight (GB)

(72) Inventors: Paul John Spencer, Southampton (GB); Benjamin Edward Creaser, Ryde (GB)

(73) Assignee: Gurit (UK) Ltd., Newport, Isle of Wight (GB)

( * ) Notice: Subject to any disclaimer, the term of this patent is extended or adjusted under 35 U.S.C. 154(b) by 2 days.

(21) Appl. No.: 15/516,552

(22) PCT Filed: Oct. 8, 2015

(86) PCT No.: PCT/EP2015/073287
§ 371 (c)(1),
(2) Date: Apr. 3, 2017

(87) PCT Pub. No.: WO2016/055581
PCT Pub. Date: Apr. 14, 2016

(65) Prior Publication Data
US 2017/0306110 A1 Oct. 26, 2017

(30) Foreign Application Priority Data
Oct. 9, 2014 (GB) .................................. 1417877.6

(51) Int. Cl.
C08G 59/40 (2006.01)
C08G 59/50 (2006.01)
(Continued)

(52) U.S. Cl.
CPC .......... C08J 5/042 (2013.01); C08G 59/4014 (2013.01); C08G 59/4021 (2013.01); C08J 5/10 (2013.01);
(Continued)

(58) Field of Classification Search
None
See application file for complete search history.

(56) References Cited

U.S. PATENT DOCUMENTS 4,680,341 A * 7/1987 Newman-Evans ......... C07D 303/36
525/113
4,912,190 A 3/1990 Schafer
(Continued)

FOREIGN PATENT DOCUMENTS

DE 2166606 A1 10/1974
DE 2743015 A1 4/1979
(Continued)

OTHER PUBLICATIONS

Int'l. Search Report and Written Opinion dated Jan. 19, 2016 in priority application PCT/EP2015/073287.
(Continued)

Primary Examiner — Richard A Huhn
(74) Attorney, Agent, or Firm — Polsinelli, PC

(57) ABSTRACT

A prepreg having at least one layer of carbon fibers and a curable thermosetting resin system, the curable thermosetting resin system at least partly impregnating the at least one layer of carbon fibers, wherein the curable thermosetting resin system includes: a curable thermosetting resin including at least one epoxide group, the curable thermosetting resin having an epoxy equivalent weight of from 140 to 180 g/eq; a curing agent for curing the curable thermosetting resin, wherein the curing agent is present in the liquid phase and includes a cyanamide reactive group; and a rheology modifier for the curable thermosetting resin system, wherein the rheology modifier includes at least one of a thermoplastic resin and an inorganic particulate thickener or a mixture thereof.

27 Claims, 1 Drawing Sheet

(51) Int. Cl.
    C08J 5/24      (2006.01)
    C08L 63/00     (2006.01)
    C08L 63/04     (2006.01)
    C08K 3/04      (2006.01)
    C08K 7/06      (2006.01)
    C08J 5/04      (2006.01)
    C08J 5/10      (2006.01)
    C08K 3/36      (2006.01)
    C08L 71/00     (2006.01)

(52) U.S. Cl.
    CPC ............... *C08J 5/24* (2013.01); *C08K 3/04* (2013.01); *C08K 3/36* (2013.01); *C08L 63/00* (2013.01); *C08L 63/04* (2013.01); *C08L 71/00* (2013.01); *C08G 59/40* (2013.01); *C08G 59/50* (2013.01); *C08G 59/504* (2013.01); *C08G 59/5006* (2013.01); *C08G 2650/56* (2013.01); *C08J 2363/00* (2013.01); *C08K 7/06* (2013.01)

(56) References Cited

U.S. PATENT DOCUMENTS

| | | | | |
|---|---|---|---|---|
| 5,993,929 | A | * | 11/1999 | Bizer ............... B32B 7/06 428/43 |
| 9,382,374 | B2 | | 7/2016 | Strobel |
| 2013/0032342 | A1 | | 12/2013 | Strobel et al. |
| 2014/0002474 | A1 | | 1/2014 | Strobel et al. |
| 2014/0024741 | A1 | * | 1/2014 | Strobel ............... C08G 59/46 523/400 |
| 2015/0158970 | A1 | | 6/2015 | Strobel et al. |
| 2015/0158972 | A1 | | 6/2015 | Strobel et al. |

FOREIGN PATENT DOCUMENTS

| | | | |
|---|---|---|---|
| DE | 4217509 A1 | | 12/1993 |
| GB | 2514189 A | | 11/2014 |
| JP | 2008088277 A | * | 4/2008 |
| JP | 2011057616 A | | 3/2011 |
| WO | 2012113878 A1 | | 8/2012 |
| WO | 2012113879 A1 | | 8/2012 |
| WO | WO-2012113878 A1 | * | 8/2012 ............ C08G 59/46 |
| WO | 2014020060 A2 | | 2/2014 |
| WO | 2014020072 A2 | | 2/2014 |

OTHER PUBLICATIONS

Combined Search and Examination Report under Sections 17 and 18(3) dated Apr. 13, 2015 in priority application GB1417877.6.
Int'l. Preliminary Report on Patentability dated Apr. 11, 2017 in priority application PCT/EP2015/073287.

* cited by examiner

CARBON FIBRE-CONTAINING PREPREGS

FIELD OF THE INVENTION

The present invention relates to prepregs comprising at least one layer of carbon fibres and a curable thermosetting resin system, to a method of producing carbon fibre reinforced resin matrix composite material and to the use of a curing system in a prepreg comprising at least one layer of carbon fibres and a curable thermosetting resin system.

BACKGROUND OF THE INVENTION

Carbon fibre composite materials are commonly employed in high cost/high performance applications where light-weight structures are required. For many applications, coupled with the high mechanical performance of carbon fibre composite materials is the unique visual appearance of carbon fibre composite laminates, in particular those using woven carbon fabrics. Such an aesthetic appearance of carbon fibres is highly desirable, and carbon fibre composite materials find many applications in high-value markets such as automotive components, luxury yachts and consumer electronics where the visual appearance of the carbon fibres as well as the technical performance of the composite material is important to the user/consumer. For these so-called "cosmetic" applications of carbon fibre composite materials, the visual aspect of the cured laminate needs to be of high quality and free from imperfections such as discontinuous fibres, particle contamination and surface effects, for example pin holes, fish eyes, blisters, etc.

Historically for the manufacture of cosmetic quality laminates, carbon fibre prepregs are used. The prepregs comprise at least one layer of carbon fibres and a curable thermosetting resin system, typically an epoxy resin. The thermosetting resin in these prepregs is typically cured using dicyandiamide-based catalysis. Dicyandiamide is added as a powder to the curable resin. The solubility of dicyandiamide in commonly employed resin chemistries is generally poor. Therefore, after cure, residual particles of dicyandiamide are frequently observed in areas of high resin content. To reduce this effect, the prepreg user is required to use low resin content prepregs and careful processing. These both introduce disadvantageous aspects to the component manufacture and do not fully mitigate the defects described.

Whilst it has been historically possible to employ liquid curing compounds such as imidazoles in order to achieve clear cured resins, such curing compounds have technical disadvantages such as short latency (leading to significantly reduced shelf life of the uncured prepreg), increased cost, and, depending on the chemistry used, often reduced thermal-mechanical properties and panel clarity, exhibited by excessive resin colour and opacity.

There is therefore currently a need in the art for a carbon fibre prepreg which includes a thermosetting resin system which not only provides a high quality processing, with a high latency of the curing system and a controlled curing, but also provides a combination of high quality thermomechanical properties and visual appearance.

WO-A-2012/113878 and WO-A-2012/113878 disclose liquid curing agents for thermosetting resins.

SUMMARY OF THE INVENTION

The present invention aims to provide a carbon fibre prepreg which can readily be used in "cosmetic" applications and which can exhibit highly clear cured resin matrices, allowing a high quality visual appearance of the carbon fibres, with zero visible catalyst particles.

The present invention aims to provide a carbon fibre prepreg which can provide a high quality visual appearance of the carbon fibres, combined with good resin processing and high latency.

The present invention accordingly provides a prepreg comprising at least one layer of carbon fibres and a curable thermosetting resin system, the curable thermosetting resin system at least partly impregnating the at least one layer of carbon fibres, wherein the curable thermosetting resin system comprises:
  a. a curable thermosetting resin including at least one epoxide group, the curable thermosetting resin having an epoxy equivalent weight of from 140 to 180 g/eq;
  b. a curing agent for curing the curable thermosetting resin, wherein the curing agent is present in the liquid phase and includes a cyanamide reactive group; and
  c. a rheology modifier for the curable thermosetting resin system, wherein the rheology modifier comprises at least one of a thermoplastic resin and an inorganic particulate thickener or a mixture thereof.

The present invention further provides a prepreg comprising at least one layer of carbon fibres and a curable thermosetting resin system, the curable thermosetting resin system at least partly impregnating the at least one layer of carbon fibres, wherein the curable thermosetting resin system comprises:
  a. a curable thermosetting resin including at least one epoxide group, the curable thermosetting resin having an epoxy equivalent weight of from 140 to 180 g/eq;
  b. a curing agent for curing the curable thermosetting resin, wherein the curing agent includes a cyanamide constituent which is present in the liquid phase; and
wherein the curing agent is formulated to remain in the liquid phase prior to curing of the thermosetting resin so as to avoid the presence of particles of curing agent as a separate phase within the cured thermoset resin system, and wherein the thermosetting resin system is formulated to have a minimum viscosity during curing minimum viscosity at a temperature of from 100 to 120° C., optionally from 105 to 115° C., further optionally about 110° C.

The present invention further provides a method of producing carbon fibre reinforced resin matrix composite material, the method comprising the steps of:
  a. providing a laminated stack of prepregs according to the present invention; and
  b. heating up the laminated stack of prepregs to cause the curable thermosetting resin system to flow and fully impregnate the carbon fibres and to cure to form a cured thermoset resin matrix.

The present invention further provides the use, in a prepreg comprising at least one layer of carbon fibres and a curable thermosetting resin system, the curable thermosetting resin system at least partly impregnating the at least one layer of carbon fibres and comprising a curable thermosetting resin including at least one epoxide group, the curable thermosetting resin having an epoxy equivalent weight of from 140 to 180 g/eq, of a curing system comprising a liquid phase curing agent which includes a cyanamide reactive group for avoiding a visible residue of particles of curing agent in a carbon fibre reinforced resin matrix composite material produced from the prepreg.

Preferred or optional features are defined in the respective dependent claims.

The present invention is at least partly predicated on the finding by the present inventors that using an alternative catalyst/curing compound to dicyandiamide, in the form of a liquid curing agent with similar chemical functional groups, together with a curable thermosetting resin including at least one epoxide group, the curable thermosetting resin having an epoxy equivalent weight of from 140 to 180 g/eq, it is possible to formulate a prepreg resin system with similar handling, curing and thermal-mechanical properties as dicyandiamide based prepregs, yet remove or avoid any presence of insoluble particles, thereby significantly improving the surface finish of the resultant cured composite material components. Furthermore, the cured resin can have a high glass transition temperature, Tg, typically above 175° C., for example about 179° C. Such high Tg cured composite material components are suitable for the manufacture of components which are subjected to high temperature either during subsequent manufacturing processes or during the product lifetime. For example, vehicle body panels formed from the cured composite material components may need to be processed though a high temperature varnish/paint line, and it is essential that the Tg of the cured resin is higher than the processing temperature otherwise the vehicle body panel would become deformed.

The present invention has particular application to the formulation of carbon fibre prepregs where the final cured laminate is desired to have a high quality surface finish, for example for unpainted carbon fibre finish components. These are common place in high-value consumer applications such as niche cars, luxury yachts, and high-end consumer electronics.

The prepregs of the preferred embodiments of the present provide a number of technical advantages over known carbon fibre prepregs, and are formulated to provide not only enhanced mechanical properties but also aesthetic properties as a result of the carbon fibres being visible to the consumer/user through a clear resin matrix.

In particular, the processing of carbon fibre prepregs of the preferred embodiments can be less sensitive to resin content, tool design and laminate processing as compared to known prepregs.

As compared to the use of particulate dicyandiamide curing agent, the "scrap" rate of cosmetic components due to presence of visible particles can be reduced to zero, which provides a significant cost saving to the manufacture of the composite material components.

Higher resin content prepregs can be used, if required, as compared to the resin content which could be used for cosmetic carbon products incorporating particulate dicyandiamide curing agent, the latter typically and conventionally having a resin content kept low, at typically <40% by weight relative to the total prepreg weight, to ensure that the presence of any insoluble curing agent particles was minimised.

The prepreg of the preferred embodiments of the invention is more tolerant to varied processing and cure temperatures than when using particulate dicyandiamide curing agent. Typically and conventionally the cure profile of prepregs comprising particulate dicyandiamide curing agent for cosmetic applications needed to be carefully controlled to ensure optimal dissolution of any catalyst or accelerator particles present in the resin matrix. The combined epoxide resin/curing agent system employed in the present invention can permit readily controllable curing conditions to be implemented, ensuring the reliable industrial production of composite materials which exhibit the combination of high quality mechanical and aesthetic properties.

BRIEF DESCRIPTION OF THE DRAWINGS

Embodiments of the present invention will now be described by way of example only with reference to the accompanying drawings, in which.

DETAILED DESCRIPTION

Figure 1:
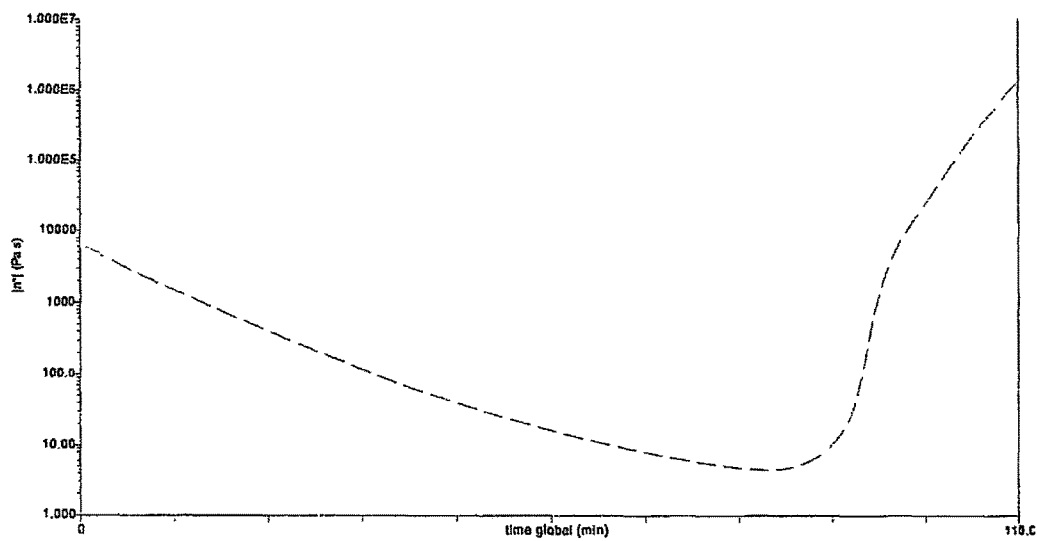
FIG. 1 is a graph showing the relationship between viscosity and time for a thermosetting resin system according to an Example of the present invention.

In accordance with preferred embodiments of the present invention, there is provided a prepreg. The prepreg comprises at least one layer of carbon fibres and a curable thermosetting resin system.

The carbon fibres may be present in any form known to those skilled in the art, and typically are present in the form of a woven fabric. Various weave patterns and fabric weights may be employed, in accordance with the common general knowledge of the skilled person. The carbon fibres may have a uniaxial, biaxial or multiaxial fibre orientation, as is well known to those skilled in the art.

The curable thermosetting resin system at least partly impregnates the at least one layer of carbon fibres. Typically, the curable thermosetting resin system fully impregnates the at least one layer of carbon fibres. Alternatively, a "semi-preg" prepreg structure may be provided, in which a layer of the resin is adjacent to a layer of carbon fibres. In either prepreg construction, during the curing step the resin is heated and is consequently lowered in viscosity so as to flow and fully to wet out the fibres and form a coherent resin matrix surrounding the fibres prior to curing of the resin.

The curable thermosetting resin system of the preferred embodiments comprises four components:
a. a curable thermosetting resin including at least one epoxide group, the curable thermosetting resin having an epoxy equivalent weight of from 140 to 180 g/eq;
b. a curing agent for curing the curable thermosetting resin, wherein the curing agent is present in the liquid phase and includes a cyanamide reactive group; and
c. a rheology modifier for the curable thermosetting resin system, wherein the rheology modifier comprises at least one of a thermoplastic resin and an inorganic particulate thickener or a mixture thereof.

As discussed below, in certain embodiments the rheology modifier may be omitted.

The curable thermosetting resin is typically selected from at least one of an epoxy resin, an epoxy novolac resin, an epoxy cresol novolac resin and an epoxy phenol novolac resin, or a mixture of any two or more thereof. Typically, the curable thermosetting resin is a mixture of at least one tetrafunctional epoxy resin and at least one epoxy novolac resin. The curable thermosetting resin is preferably a mixture, or blend, of from 30 to 60 wt % of the at least one tetrafunctional epoxy resin and from 70 to 30 wt % of the at least one epoxy novolac resin, each based on the weight of the curable thermosetting resin. More preferably, the at least one tetrafunctional epoxy resin has an epoxy equivalent weight of from 105 to 125 g/eq and the at least one epoxy novolac resin comprises a first epoxy novolac resin which has an epoxy equivalent weight of from 190 to 235 g/eq and a second epoxy novolac resin which has an epoxy equivalent weight of from 175 to 190 g/eq. Typically, the first and second epoxy novolac resins are each present in an amount of from 25 to 30 wt %, each based on the weight of the curable thermosetting resin. The mixture or blend can provide an overall epoxy equivalent weight of from 140 to 180 g/eq.

The epoxy resin, and the associated curing agent and accelerator, may be formulated so that the epoxy resin is to be cured at various curing temperatures. A typical curing temperature is 180° C., although other curing temperatures may be employed. The cured epoxy resin may be formulated to have a desired glass transition temperature, Tg, as known to those skilled in the art. Typically, the epoxy resin has a Tg of from 160 to 190° C., typically from 175 to 180° C., for example about 179° C.

The curable thermosetting resin is typically blended with the rheology modifier, although in some embodiments no such rheology modifier is present in the curable thermosetting resin system. As stated above, the rheology modifier typically comprises at least one of a thermoplastic resin and an inorganic particulate thickener or a mixture thereof. The rheology modifier provides the required drape, handling properties and mechanical properties for the particular application of the prepreg to be moulded. In some embodiments, the drape properties may be provided by the curable thermosetting resin, thereby obviating the need for a rheology modifier.

Typically, when the rheology modifier is a thermoplastic resin, the rheology modifier includes at least one of a phenoxy resin, an acrylic resin, a polyacrylate resin, a polyacrylonitrile resin, a polyetherimide resin, a polyketone resin and a polysulphone resin, or a mixture of any two or more thereof. Most typically, the thermoplastic resin is a phenoxy resin, such as a phenoxy resin available in powder form under the trade name InChemRez PKHP-200 available in commerce from InChem Corporation. Typically the thermoplastic resin of the rheology modifier has a softening point within the range of from 170 to 190° C., further optionally from 175 to 185° C., yet further optionally about 180° C., for example as provided by the InChemRez PKHP-200 product.

The weight ratio of the curable thermosetting resin and the thermoplastic resin of the rheology modifier is controlled so as to provide the desired drape, handling and mechanical properties to the prepreg. For example, the resin portion of the curable thermosetting resin system, namely the curable thermosetting resin and the thermoplastic resin of the rheology modifier, may typically include about 90 wt % of the base thermosetting resin, for example epoxy resin. Typically, the curable thermosetting resin and the thermoplastic resin of the rheology modifier are present in a weight ratio of from 80:20 to 99:1, optionally from 85:15 to 95:5, for example about 90:10.

As well as or instead of a thermoplastic resin rheology modifier, the rheology modifier may comprise an inorganic particulate thickener, such as fumed silica. Typically, the fumed silica is present in an amount of from 0.5 to 1 wt %, based on the weight of the curable thermosetting resin system. The rheology modifier may optionally further comprise at least one polyhydroxycarboxylic acid amide as a dispersion and wetting aid for the fumed silica, the at least one polyhydroxycarboxylic acid amide being present in an amount of from 10 to 40 wt % of the weight of the fumed silica.

Other inorganic particulate thickeners are known in the art and may be employed in the invention.

In each embodiment, the composition and amount of the rheology modifier(s) may readily be selected based on the desired drape properties of the prepreg during layup of the prepreg into a mould, and also selected based on the desired flow properties of the curable thermosetting resin system during the curing step at elevated temperature.

The curing agent used in accordance with the present invention is in the form of a liquid and so has no particles. Furthermore, the curing agent is reactive enough to cure within a desired cure schedule, defined by time and temperature. The curing agent also has latency to provide storage stability for the prepreg material.

For achieving the desired properties of the cured thermoset resin, the curing agent should be used in a suitable ratio together with the curable thermoset epoxide-containing resin as discussed above. The active hydrogen equivalent weight of the curing agent and the epoxy equivalent weight of the selected resin are used to determine the ideal mix ratio, as known to those skilled in the art. The mix ratio and the components are selected in order to ensure that the material cures within the desired cure schedule and also in order to control the resin flow properties prior to resin gelation during prepreg resin curing to form the composite material during manufacture.

There are numerous other liquid curing agents that could be used for the purpose of the curing the resin formulation. These include many amines and imidazoles. However, these result in a number of drawbacks for the required application, meaning that they were not selected for use within the resin formulation according to the preferred embodiments of the present invention. For example, many amines and imidazoles exhibit poor shelf-life when mixed with resin. Imidazoles also commonly result in final products that are very dark in colour, which would be detrimental within a visual quality product. They also frequently cause a reduction in mechanical properties when compared with other curing agents.

Typically, the curing agent comprises cyanamide of formula $NC-NH_2$. The cyanamide curing agent may be provided as a liquid curing agent commercially available under the trade name of Dyhard VP111 by AlzChem AG, Germany Typically the curing agent is present in an amount of from 6 to 13 wt % based on the weight of the curable thermosetting resin system Typically, in the prepreg the curable thermosetting resin system comprises from 35 to 45 wt % of at least one tetrafunctional epoxy resin which has an epoxy equivalent weight of from 105 to 125 g/eq, from 20 to 30 wt % of a first epoxy novolac resin which has an epoxy equivalent weight of from 190 to 235 g/eq, from 20 to 30 wt % of a second epoxy novolac resin which has an epoxy equivalent weight of from 175 to 190 g/eq, from 50 to 15 wt % of a phenoxy resin, from 8 to 10 wt % of a liquid phase curing agent which includes a cyanamide reactive group, from 0.5 to 1 wt % of fumed silica and from 0.1 to 0.3 wt % of a polyhydroxycarboxylic acid amide as a dispersion and wetting aid for the fumed silica, the amounts being based upon the weight of the curable thermosetting resin system.

By selecting the curing agent and its amount and the specific epoxide resin component and its amount, during resin curing, resin flow during the temperature ramp stage of the cure cycle prior to gelation can be readily controlled. Furthermore, the curing can be controlled over a range of cure schedules. In addition, the properties of the final cured epoxy resin in the composite material can be controlled.

For the curing agent within the preferred formulation, it is desirable that it is latent at ambient temperatures, thus allowing good shelf-life of the mixed, uncured product under ambient conditions.

When formulating the curable thermosetting resin system, the base epoxide-containing resin and the thermoplastic resin rheology modifier are blended to form the overall resin constituent of the formulation and the curing agent and inorganic particulate thickener, together with any wetting/dispersion aid, are mixed together to form the catalyst paste. The catalyst paste can be either with or without a carrier. Typically, no carrier is required. The overall resin constituent and the catalyst paste are mixed together in the desired ratio prior to impregnation of the carbon fibres during manufacture of the prepreg. The curable thermosetting resin composition is permitted to partly cure to the desired B-stage so as to provide the required drape properties of the resin prior to use in a moulding process to form a composite material. The moulding process is typically conducted under a negative pressure provided by a vacuum, but alternatively may be conducted under an elevated positive pressure in an autoclave.

The present invention further provides a method of producing carbon fibre reinforced resin matrix composite material for the prepregs of the invention.

In the method, a laminated stack of prepregs is provided. The stack is typically laid up in or on a mould, so that the resultant composite material has the desired shape, configuration and dimensions. Then the stack of prepregs is the typically subjected to vacuum moulding, in which the prepreg stack is maintained in a vacuum throughout the curing cycle. The vacuum removes interlaminar and intralaminar air so as to reduce the void volume of the resultant moulded composite material product. Alternatively, an autoclave moulding process may be employed. Still further, the composite material product may be moulded by press moulding the multilaminar stack of prepregs.

Each prepreg comprises at least one layer of carbon fibres and a curable thermosetting resin system. The curable thermosetting resin system at least partly impregnates the at least one layer of carbon fibres. The curable thermosetting resin system is described above. As discussed above, a rheology modifier may optionally be present.

In the mould, the laminated stack of prepregs is heated up to cause the curable thermosetting resin system to flow and fully impregnate the carbon fibres and to cure to form a cured thermoset resin matrix.

The epoxide-containing resin system and the curing agent are formulated to remain in the liquid phase prior to curing of the thermosetting resin so as to avoid the presence of particles of curing agent as a separate phase within the cured thermoset resin system. In addition, the thermosetting resin system is formulated to have a minimum viscosity during curing wherein the curing agent is formulated to remain in the liquid phase prior to curing of the thermosetting resin so as to avoid the presence of particles of curing agent as a separate phase within the cured thermoset resin system, and wherein the thermosetting resin system is formulated to have a minimum viscosity at a temperature of from 100 to 120° C., optionally from 105 to 115° C., further optionally about 110° C.

Typically, the thermosetting resin system is formulated to have a minimum viscosity of from 3 to 6 Pa·s at a temperature of from 105 to 115° C., for example a minimum viscosity of from 4 to 5 Pa·s at a temperature of from 107 to 112° C. For the rheological testing, in this specification the viscosity is measured using the following parameters: TA Instruments AR2000EX, instrument in oscillation, 30-180° C. at 1° C./min, controlled strain of 1%, frequency of 1 Hz.

Typically, the thermosetting resin system is formulated to have curing reactivity so that the viscosity of the thermosetting resin system is above 10000 Pa·s at a temperature of from 123 to 129° C.

Optionally, during the heating step the laminated stack of prepregs is heated from ambient temperature (typically 20° C.) up to a curing temperature of from 170 to 190° C. at a ramp rate of from 0.5 to 2° C./minute and held at the curing temperature for a period of at least 30 minutes. Typically, during the heating step the laminated stack of prepregs is heated from ambient temperature up to a curing temperature of from 175 to 185° C. at a ramp rate of from 0.75 to 1.5° C./minute and held at the curing temperature for a period of at least 30 minutes. Optionally, during the heating step the curable thermosetting resin has a viscosity of from 3 to 6 Pa·s at a temperature of from 105 to 115° C.

The present invention will now be illustrated in greater detail with reference to the following non-limiting Example.

Example 1

In Example 1, the catalyst paste comprised 90.5 wt % Dyhard Fluid VP111 curing agent, 7.5 wt % fumed silica (a commercially available fumed silica sold as Cabosil M5 by Cabot Corporation, USA) and 2 wt % of a polyhydroxycarboxylic acid amide as a dispersion and wetting aid for the fumed silica (commercially available as BYK-R 605 from BYK-Chemie GmbH, Germany)

The catalyst paste was combined with the base resin portion, comprising the epoxy resin and thermoplastic resin rheology modifier, to provide a mix ratio of 100 parts by weight base resin/rheology modifier blend to 10 parts catalyst paste.

The base resin portion comprised a blend of 40 wt % of Epikote 496 (commercially available from Hexion Speciality Chemicals GmbH., Germany), a tetrafunctional epoxy resin which has an epoxy equivalent weight of 114.9+/−4.5 g/eq, 25 wt % of EPON Resin SU-8 (commercially available from Momentive Speciality Chemicals Inc., USA), an epoxy novolac resin which has an epoxy equivalent weight of from 195 to 230 g/eq, 25 wt % of D.E.N. 438 (commercially available from The Dow Chemical Company, USA), an epoxy novolac resin which has an epoxy equivalent weight of from 176 to 181 g/eq, and 10 wt % of a phenoxy thermoplastic resin available in commerce from InChem Corporation under the trade name PKHP-200. The weight percentage values are with respect to the base resin portion. The blend had an overall epoxy equivalent weight within the range of from 140 to 180 g/eq.

The resin blend and the catalyst paste were mixed to form the curable epoxy resin composition for incorporation into a carbon fibre prepreg.

The curable resin was subjected to a curing schedule, which simulated a curing schedule to be used for making moulded composite material products using the prepregs, of heating from ambient temperature at a ramp rate of 1° C./min to a curing temperature of 180° C. and holding at 180° C. for a period of 30 minutes. It was found that there was satisfactory curing within the required time frame, at the required temperatures and also resulted in satisfactory mechanical properties of the resultant cured resin.

Figure 2:
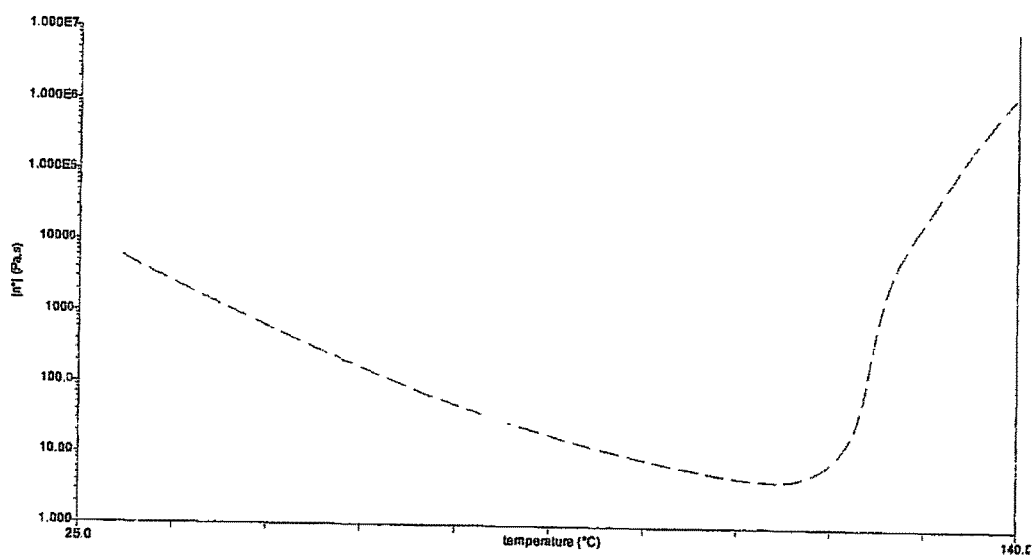
FIG. 2 is a graph showing the relationship between viscosity and temperature for thermosetting resin system according to an Example of the present invention.

FIG. 1 shows the relationship between viscosity (y-axis) and time (x-axis) during the curing schedule. FIG. 2 shows the relationship between viscosity (y-axis) and temperature (x-axis) during the curing schedule.

It may be seen from FIGS. 1 and 2 that as the temperature is increased, the viscosity of the resin decreases. The reduced resin viscosity permits the resin to flow and fully wet out and impregnate the prepreg carbon fibres. A viscosity minimum was achieved after a period of about 80 minutes at a temperature of about 110° C. The minimum viscosity was about 4.5 Pa·s.

In other preferred examples, the viscosity minimum may be achieved at 95 to 105° C. and the minimum viscosity may be 6 to 18 Pa·s, using a similar cure schedule to that used in Example 1.

After the viscosity minimum was achieved, the viscosity rapidly increased, which indicates that the resin is rapidly curing. The rapid cure ensures that the mechanical properties of the resultant cured resin are enhanced. The viscosity increased to at least 10000 Pa·s at 126° C. In other preferred examples, the viscosity may be increased to at least 10000 Pa·s in the range of 123 to 129° C.

The minimum viscosity of the mixed resin/catalyst paste system was sufficiently high to allow the resin to flow less during the early stages of the cure, which would result in less resin being lost from the prepreg. This, in turn, improves both the quality of the cured product and reduces the wasted resin.

In combination therefore, the resin system provided a desired rapid cure schedule, to enable the product to cure as required, and resulted in both optimum wet-out/bleed and cured mechanical properties, yet avoiding any visible white residue in the cured resin. The aesthetic appearance of the cured resin was excellent, with high clarity. Furthermore, the cured resin had a high Tg of 179° C. The resultant carbon fibre prepreg is suitable for manufacturing composite material parts for high quality cosmetic applications.

Various modifications to the preferred embodiments of the present invention and to the Example of the present invention will readily be apparent to those skilled in the art and are encompassed within the scope of the present invention

The invention claimed is:

1. A prepreg comprising at least one layer of carbon fibres and a curable thermosetting resin system, the curable thermosetting resin system at least partly impregnating the at least one layer of carbon fibres, wherein the curable thermosetting resin system comprises:
   a. a curable thermosetting resin including at least one epoxide group, the curable thermosetting resin having an epoxy equivalent weight of from 140 to 180 g/eq, wherein the curable thermosetting resin system has a minimum viscosity at a temperature of from 100 to 120° C.;
   b. a curing agent for curing the curable thermosetting resin, wherein the curing agent is present in the liquid phase and includes a cyanamide reactive group; and
   c. a rheology modifier for the curable thermosetting resin system, wherein the rheology modifier comprises at least one of a thermoplastic resin and an inorganic particulate thickener or a mixture thereof.

2. A prepreg according to claim 1 wherein the curing agent comprises cyanamide of formula NC—NH$_2$.

3. A prepreg according to claim 1 wherein the curing agent is present in an amount of from 6 to 13 wt % based on the weight of the curable thermosetting resin system.

4. A prepreg according to claim 1 wherein the curable thermosetting resin is a mixture of from 30 to 60 wt % of the at least one tetrafunctional epoxy resin and from 70 to 40 wt % of the at least one epoxy novolac resin, each based on the weight of the curable thermosetting resin.

5. A prepreg according to claim 4 wherein the at least one tetrafunctional epoxy resin has an epoxy equivalent weight of from 105 to 125 g/eq and the at least one epoxy novolac resin comprises a first epoxy novolac resin which has an epoxy equivalent weight of from 190 to 235 g/eq and a second epoxy novolac resin which has an epoxy equivalent weight of from 175 to 190 g/eq.

6. A prepreg according to claim 5 wherein the first and second epoxy novolac resins are each present in an amount of from 25 to 30 wt %, each based on the weight of the curable thermosetting resin.

7. A prepreg according to claim 1 wherein the minimum viscosity is at a temperature of from 105 to 115° C.

8. A prepreg according to claim 1 wherein the thermoplastic resin of the rheology modifier has a softening point within the range of from 170 to 190° C.

9. A prepreg according to claim 8 wherein the thermoplastic resin of the rheology modifier has a softening point within the range of from 175 to 185° C., optionally about 180° C.

10. A prepreg according to claim 1 wherein the rheology modifier includes at least one of a phenoxy resin, an acrylic resin, a polyacrylate resin, a polyacrylonitrile resin, a polyetherimide resin, a polyketone resin and a polysulphone resin, or a mixture of any two or more thereof.

11. A prepreg according to claim 10 wherein the rheology modifier comprises at least one phenoxy resin.

12. A prepreg according to claim 1 wherein the curable thermosetting resin and the thermoplastic resin of the rheology modifier are present in a weight ratio of from 80:20 to 99:1.

13. A prepreg according to claim 12 wherein the curable thermosetting resin and the thermoplastic resin of the rheology modifier are present in a weight ratio of from 85:15 to 95:5, optionally about 90:10.

14. A prepreg according to claim 1 wherein the inorganic particulate thickener comprises fumed silica.

15. A prepreg according to claim 14 wherein the fumed silica is present in an amount of from 0.5 to 1 wt %, based on the weight of the curable thermosetting resin system.

16. A prepreg according to claim 14 wherein the rheology modifier further comprises at least one polyhydroxycarboxylic acid amide as a dispersion and wetting aid for the fumed silica, the at least one polyhydroxycarboxylic acid amide being present in an amount of from 10 to 40 wt % of the weight of the fumed silica.

17. A prepreg according to claim 14 wherein the curable thermosetting resin system comprises from 35 to 45 wt % of at least one tetrafunctional epoxy resin has an epoxy equivalent weight of from 105 to 125 g/eq, from 20 to 30 wt % of a first epoxy novolac resin which has an epoxy equivalent weight of from 190 to 235 g/eq, from 20 to 30 wt % of a second epoxy novolac resin which has an epoxy equivalent weight of from 175 to 190 g/eq, from 50 to 15 wt % of a phenoxy resin, from 8 to 10 wt % of a liquid phase curing agent which includes a cyanamide reactive group, from 0.5 to 1 wt % of fumed silica and from 0.1 to 0.3 wt % of a polyhydroxycarboxylic acid amide as a dispersion and wetting aid for the fumed silica.

18. A prepreg comprising at least one layer of carbon fibres and a curable thermosetting resin system, the curable thermosetting resin system at least partly impregnating the at least one layer of carbon fibres, wherein the curable thermosetting resin system comprises:
   a. a curable thermosetting resin including at least one epoxide group, the curable thermosetting resin having an epoxy equivalent weight of from 140 to 180 g/eq, wherein the curable thermosetting resin system is a mixture of at least one tetrafunctional epoxy resin and at least one epoxy novolac resin;

b. a curing agent for curing the curable thermosetting resin, wherein the curing agent is present in the liquid phase and includes a cyanamide reactive group;

c. a rheology modifier for the curable thermosetting resin system, wherein the rheology modifier comprises at least one of a thermoplastic resin and an inorganic particulate thickener or a mixture thereof.

19. A prepreg according to claim 18 wherein the curable thermosetting resin is a mixture of from 30 to 60 wt % of the at least one tetrafunctional epoxy resin and from 70 to 40 wt % of the at least one epoxy novolac resin, each based on the weight of the curable thermosetting resin.

20. A prepreg according to claim 19 wherein the at least one tetrafunctional epoxy resin has an epoxy equivalent weight of from 105 to 125 g/eq and the at least one epoxy novolac resin comprises a first epoxy novolac resin which has an epoxy equivalent weight of from 190 to 235 g/eq and a second epoxy novolac resin which has an epoxy equivalent weight of from 175 to 190 g/eq.

21. A prepreg according to claim 20 wherein the first and second epoxy novolac resins are each present in an amount of from 25 to 30 wt %, each based on the weight of the curable thermosetting resin.

22. A method of producing carbon fibre reinforced resin matrix composite material, the method comprising the steps of:

a. providing a laminated stack of prepregs according to claim 1; and b. heating up the laminated stack of prepregs to cause the curable thermosetting resin system to flow and fully impregnate the carbon fibres and to cure to form a cured thermoset resin matrix.

23. A method according to claim 22 wherein during the heating step the laminated stack of prepregs is heated from ambient temperature up to a curing temperature of from 170 to 190° C. at a ramp rate of from 0.5 to 2° C./minute and held at the curing temperature for a period of at least 30 minutes.

24. A method according to claim 23 wherein during the heating step the laminated stack of prepregs is heated from ambient temperature up to a curing temperature of from 175 to 185° C. at a ramp rate of from 0.75 to 1.5° C./minute and held at the curing temperature for a period of at least 30 minutes.

25. A method according to claim 22 wherein during the heating step the curable thermosetting resin has a viscosity of from 3 to 6 Pa·s at a temperature of from 105 to 115° C.

26. A method according to claim 22 wherein the thermoset resin matrix has a glass transition temperature Tg of from 160 to 190° C.

27. A method according to claim 26 wherein the thermoset resin matrix has a glass transition temperature Tg of from 175 to 180° C.

* * * * *

UNITED STATES PATENT AND TRADEMARK OFFICE
CERTIFICATE OF CORRECTION

PATENT NO. : 10,259,917 B2  
APPLICATION NO. : 15/516552  
DATED : April 16, 2019  
INVENTOR(S) : P. Spencer and B. Creaser Page 1 of 1

It is certified that error appears in the above-identified patent and that said Letters Patent is hereby corrected as shown below:

In the Claims

• Column 10, Line 46 (Claim 17, Line 13) –after "resin" insert -- which --

Signed and Sealed this
Twentieth Day of August, 2019

Andrei Iancu
*Director of the United States Patent and Trademark Office*